April 29, 1969 A. F. SPERDUTI 3,441,235
TAKE-UP REEL
Filed Feb. 10, 1966

INVENTOR.
ALEXANDER F. SPERDUTI
BY
Lindsey, Prutzman and Hayes
ATTORNEYS

INVENTOR.
ALEXANDER F. SPERDUTI
BY
Lindsey, Drutzman and Hayes
ATTORNEYS

United States Patent Office 3,441,235
Patented Apr. 29, 1969

3,441,235
TAKE-UP REEL
Alexander F. Sperduti, New Britain, Conn., assignor, by mesne assignments, to Interim Corporation, Newington, Conn., a corporation of Connecticut
Filed Feb. 10, 1966, Ser. No. 526,421
Int. Cl. B65h 57/28
U.S. Cl. 242—158.4                    8 Claims

ABSTRACT OF THE DISCLOSURE

A take-up reel having a spool which is rotatably driven and axially reciprocated for coiling stock onto the spool in parallel courses of stock with each course having compact nonoverlapping helical coils. The spool is rotated in accordance with the speed of the associated apparatus and a double acting hydraulic cylinder is employed for reciprocating the spool. The hydraulic cylinder is hydraulically operated by a primary positive displacement pump driven by the spool shaft and by an auxiliary motor driven pump connected in parallel with the primary pump and adapted to be intermittently operated to increase the axial displacement of the spool. A direction of feed sensing arm which receives the stock being fed onto the spool is pivotally mounted to operate a pair of switches corresponding to the reciprocable directions of movement of the spool and for thereby energizing the auxiliary pump motor when the axial displacement of the spool is less than optimum. A second axially reciprocable sensing arm is adapted to be engaged by the flanges of the spool when the spool reaches its limit positions to operate a selector valve for reversing the direction of operation of the hydraulic cylinder and for activating the switch corresponding to the axial direction of movement of the spool.

---

The present invention relates to take-up reels and more particularly to a take-up reel of the type which provides for coiling stock generally helically along the reel usually to provide a bundle of stock having a number of parallel courses of helically wound stock.

It is a principal aim of the present invention to provide a new and improved take-up reel of the type described which is adapted to provide for helically coiling the stock compactly on the reel without inadvertent overlapping of succeeding coils and to thereby provide a compact bundle of stock which is neat in appearance and easy to handle and which is adapted for paying out the stock without inadvertent tangling of the stock within the bundle.

Another aim of the present invention is to provide a new and improved take-up reel for compactly coiling tubular stock.

A further aim of the present invention is to provide an hydraulically operated traversing take-up reel having an accurate and reliable control of the traversal rate and stroke of the reel.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
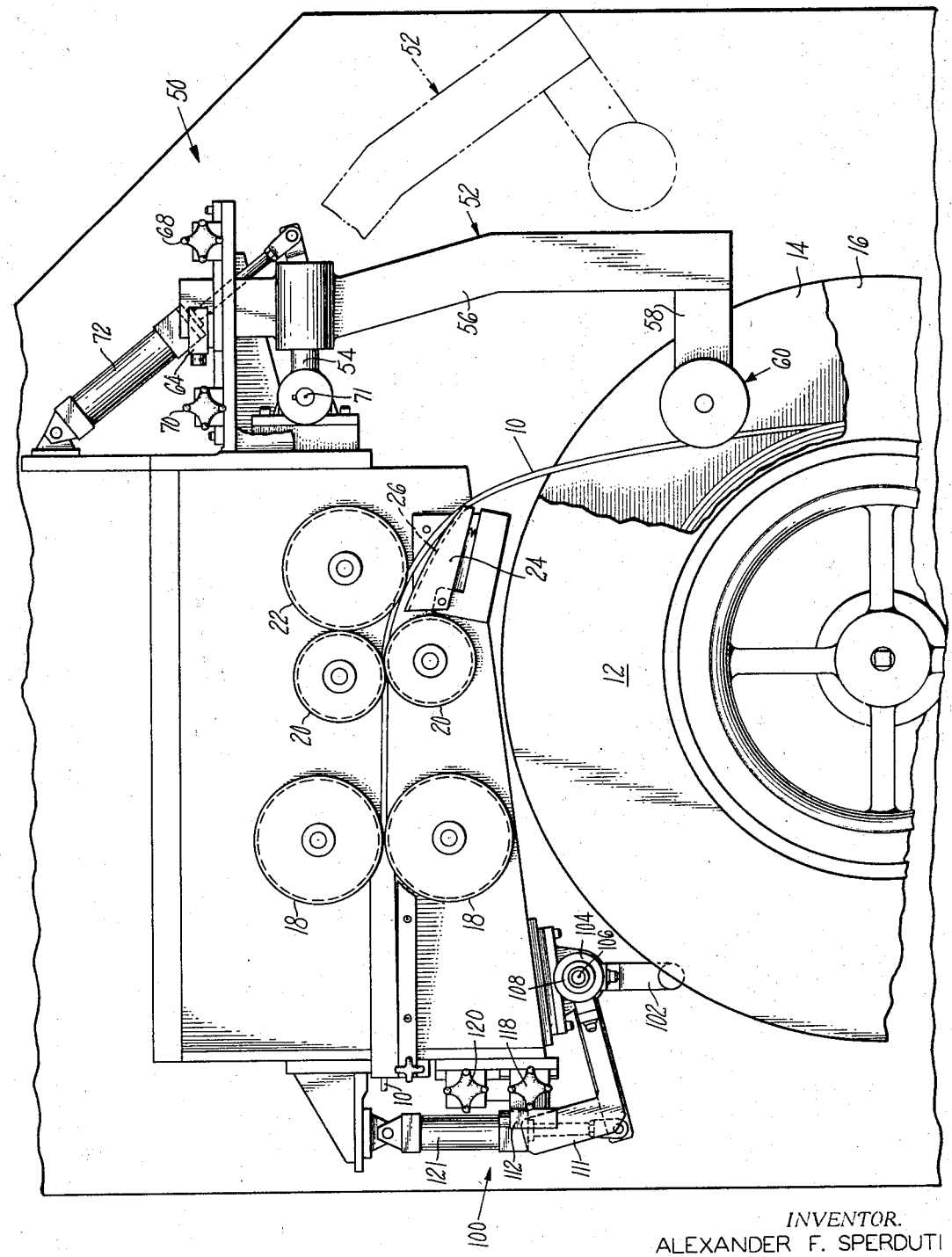
FIG. 1 is an end elevation view, partly broken away, showing a traversing take-up reel incorporating an embodiment of the present invention and showing a sensing arm in full lines in an operative position thereof and in part in broken lines in a withdrawn position thereof.

Referring now to the drawings in detail, a take-up reel incorporating an embodiment of the present invention is shown employed for coiling tubular stock 10 onto a reel or spool 12 having a cylinder 13 onto which the stock 10 is coiled and a pair of end flanges 14, 16 for axially retaining the coiled stock during the coiling operation. The cylinder 13 is adapted to be partially collapsed and the outer flange 16 is adapted to be removed after the cylinder is collapsed so that the bundle of stock coiled onto the cylinder may be readily removed. Thereafter the reel may be readily conditioned for coiling another bundle of stock on the cylinder, by expanding the cylinder to its original diameter and by replacing the outer flange 16.

For guiding the stock onto the reel, two pairs of guide rolls 18, 20 of suitable peripheral contour for the stock being coiled are mounted to feed the stock, as for example from a tube block or other stock forming apparatus, preferably perpendicularly to the axis of the reel 12, and a similar guide roll 22 is provided for suitably preforming the stock for assisting in coiling the stock onto the reel. A pivotally mounted spring biased guide block 24 having a suitable groove 26 for receiving the stock 10 is also shown provided for assisting in feeding the stock along a path which is preferably substantially perpendicular to the axis of the reel.

Figure 2:
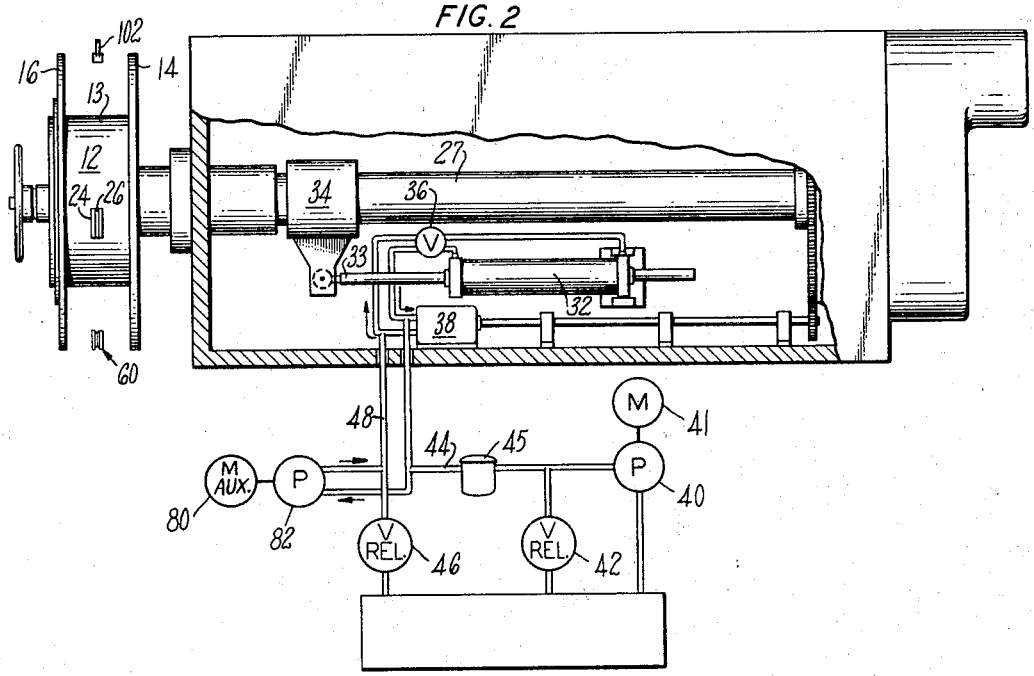
FIG. 2 shows a generally plan view, partly broken away, of the traversing take-up reel and a schematic of the hydraulic system of the take-up reel.

Referring to FIG. 2 the reel 12 is mounted on the end of a supporting spindle or shaft 27 which is adapted to be rotated by suitable means, conventionally by a chain drive deriving its power from the associated apparatus, and having its speed synchronized by electric regulation or by the use of a friction clutch which slips to enable the surface speed of the spool to remain equal to the rate the stock is being fed from the associated apparatus.

A double acting hydraulic cylinder or actuator 32 is mounted for reciprocable operation parallel with the spindle 27 and its piston rod 33 is connected to the spindle through a suitable thrust bearing 34 to axially traverse the spindle 27 back and forth in cooperation with the coiling of the stock onto the reel to facilitate the coiling operation. The hydraulic circuit for the hydraulic actuator 32 is shown including a reversing or shuttle valve 36 which is adapted to be shifted to reverse the direction of traverse of the reel, a positive displacement pump 38 which is suitably connected to be driven by the spindle 27, and a delivery or supercharger pump 40 driven by a motor 41 for supplying hydraulic fluid under pressure to the pump 38 and thereby assist in preventing leakage of air into the hydraulic system and in maintaining uniform operation of the pump 38 over a large speed range.

The positive displacement pump 38 is adapted to deliver hydraulic fluid under pressure to the hydraulic actuator at a rate which depends upon the rate the pump is driven (and therefore the r.p.m. of the spindle 27) and upon the displacement of the pump 38. Consequently the traverse lead of the reel 12 for each revolution of the spindle 27 is directly related to the displacement of the pump. For this reason the pump 38 is preferably of the type having a displacement infinitely variable within its operative range so that a pump displacement can be established in accordance with the traverse lead desired, it being understood that the traverse lead preferably will be established in accordance with the width of the stock being coiled onto the reel. The hydraulic circuit is also shown including a pressure relief valve 42 for automatically limiting the pressure in the inlet or low pressure conduit 44 of the system to for example 75 p.s.i., a filter 45 in the low pressure conduit 44 between the delivery pump 40 and the variable displacement pump 38, and a second pressure relief valve 46 for automatically limiting the pressure in the outlet or high pressure conduit 48 of the system to for example 500 p.s.i.

In accordance with the present invention the traverse lead is accurately controlled to ensure more compact coiling of the stock. More particularly the present invention provides for controlling the traverse lead so that successive coils in each course of coils are wound in close association without overlapping of the coils. In this regard it has been found that, although the displacement of the pump 38 can be preset to yield an infinitely variable traverse lead to accommodate any stock width within its capacity, a nonvariable traverse lead will not provide for compactly winding successive coils of stock without inadvertently overlapping some of the coils. Thus in accordance with the present invention the pre-established traverse lead provided by the pump 38 is continuously moderated and the traverse lead is altered when necessary to provide for compactly and uniformly coiling the stock on the reel.

In accordance with the present invention a sensing device generally denoted by the numeral 50 is provided for sensing the direction of feed of the stock 10 from the guide block 24 to the reel. This sensing device 50 is shown comprising a sensing arm 52 which is pivotally mounted by suitable bearings on a stub shaft 54 for limited oscillation back and forth substantially parallel to the axis of the reel 12. As best seen in FIG. 1 the sensing arm 52 is shown having a generally L-shape with an elongated depending portion 56 mounted on the stub shaft 54 adjacent its upper longitudinal end, and a lower projecting portion 58 extending generally perpendicularly from the lower end of the depending portion 56 and generally radially of the reel 12.

A roller or follower 60 comprising a pair of discs 61 is rotatably mounted on the outer end of the projecting portion 58, and, with the sensing arm 52 extended as shown in full lines in FIG. 1, the follower 60 is adapted to engage the tubular stock 10, for which purpose the follower discs 61 are peripherally contoured for closely receiving the stock 10. The sensing arm 52 is thereby adapted to be pivoted about the stub shaft 54 in accordance with changes in the direction of feed of the stock from the guide block 24 to the reel 12.

Figure 4:
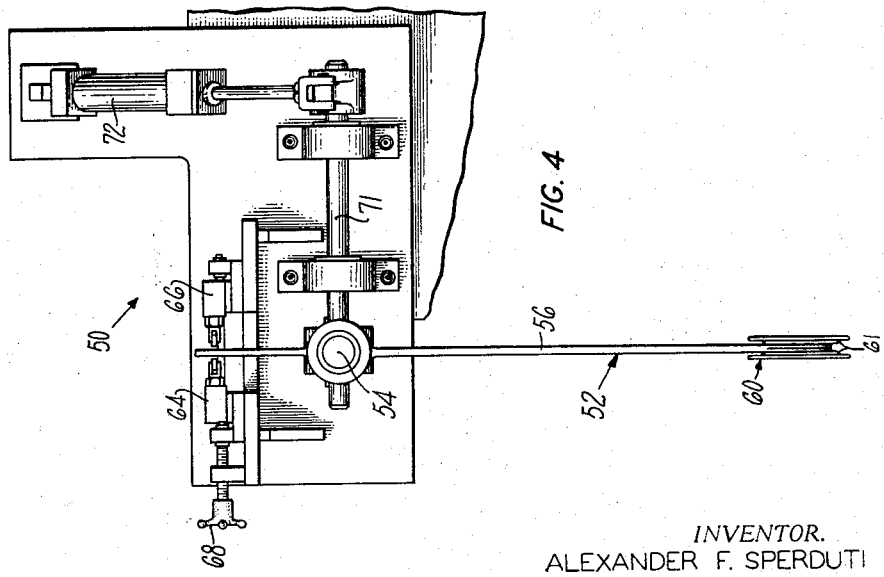
FIG. 4 is a partial side elevation view, partly broken away, of the traversing take-up reel showing the feed sensing device thereof.

Referring particularly to FIG. 4, a pair of control switches 64, 66 are mounted on opposite sides of the upper end of the sensing arm 52 for actuation by the arm. The switch 64 will be actuated by the arm 52 when the follower 60 is swung inwardly from its neutral position shown in FIG. 4, and the switch 66 will be actuated by the sensing arm 52 when the follower is swung in the opposite direction. The switches 64, 66 are shown mounted for adjustment by the knobs 68, 70 respectively to control their sensitivity to the pivotal movement of the follower 60.

In order to provide for withdrawing the arm 52 and follower 60, as for example when a bundle of coiled stock is to be removed from the reel 12, the stub shaft 54 is supported on a shaft 71 which is connected to be rotated by an air cylinder 72 for rocking the sensing arm 52 outwardly from the reel 12 to a withdrawn position shown in part by broken lines in FIG. 1. However, with the arm 52 in its extended or operating position shown in full lines in FIG. 1, the air cylinder 72 is controlled to permit the follower 60 to maintain engagement with the stock under the force of the weight of the sensing arm 52.

Figure 3:
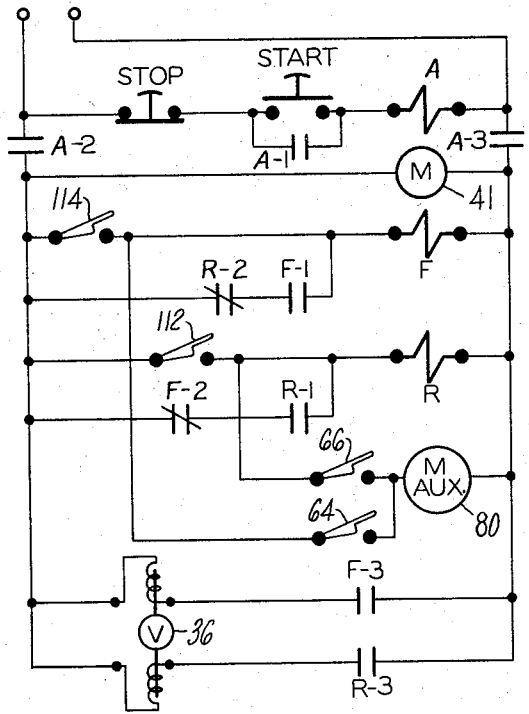
FIG. 3 is a schematic of the electrical circuit of the traversing take-up reel.

Referring to FIGS. 2 and 3 the switches 64, 66 are employed for selectively energizing an auxiliary pump motor 80 employed for driving an auxiliary positive displacement pump 82 shown connected in the hydraulic circuit in parallel with the primary positive displacement pump 38. Thus with the hydraulic circuit shown the auxiliary pump provides for increasing the traverse lead of the reel 12 when the auxiliary pump motor 80 is energized by either of the switches 64, 66. The auxiliary pump 82 preferably has a volumetric displacement at its driven speed which is somewhat less than the volumetric displacement of the primary pump 38 at its normal operating speeds so that the auxiliary pump provides for fractionally increasing the traverse lead of the reel under normal operating conditions.

Figure 6:
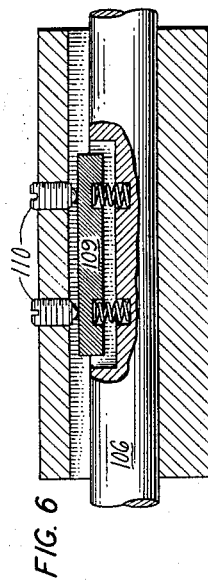
FIG. 6 is a section view, partly broken away and partly in section, taken substantially along line 6—6 of FIG. 5.
Figure 5:
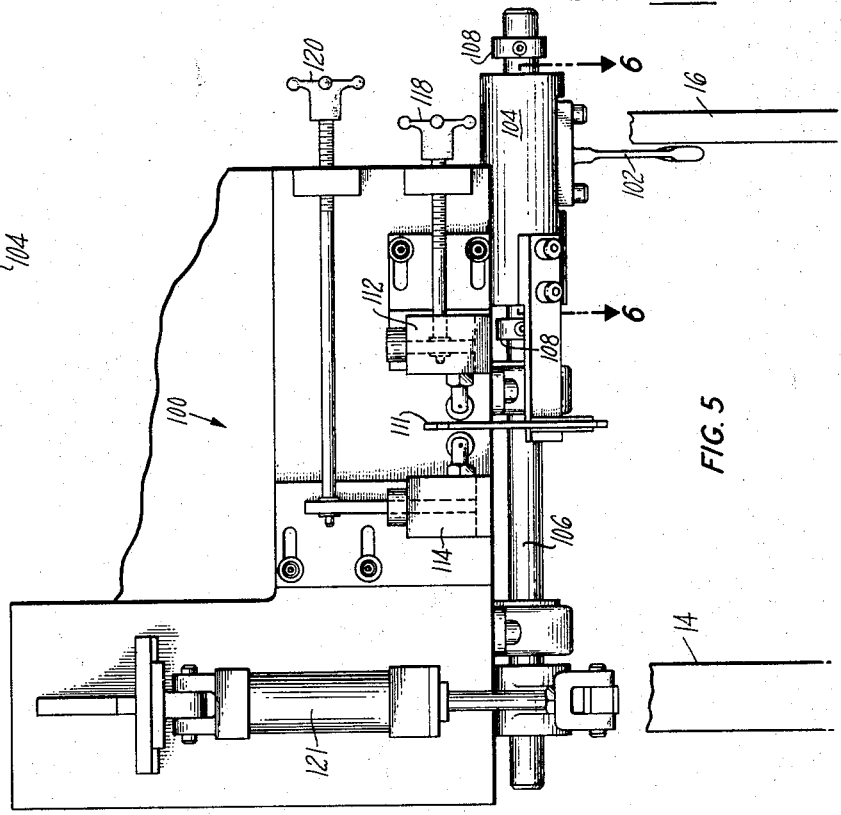
FIG. 5 is a partial side elevation view, partly broken away, of the traversing take-up reel showing the stroke sensing device thereof.

Referring to FIG. 5 the axial stroke of the traversing reel is controlled by a sensing device generally denoted by the numeral 100 having a depending sensing finger 102 which in its extended position shown in FIG. 5 is engageable by the flanges 14, 16 of the reel 12. The sensing finger 102 is mounted on a sleeve 104 which is keyed to and axially slidable on a supporting shaft 106 between adjustable collars or stops 108. Referring to FIG. 6 the shaft 106 is slotted to support a spring biased key 109 and the sleeve 104 is suitably slotted for receiving the key 109 and is provided with adjustable set screws 110 engageable with the key 109 to provide for frictionally dampening the axial movement of the sensing finger 102. A generally L-shaped arm 111 is mounted on the sleeve 104 and a pair of switches 112, 114 are mounted on opposite sides of the arm 111 for actuation by the arm 111 as the sensing finger 102 is axially displaced in opposite axial directions on its supporting shaft 106 by the reel flanges 14, 16 respectively. Thus the switch 112 is actuated by the arm 111 when the inner reel flange 14 actuates the sensing finger 102, to the right as viewed in FIG. 5, to sense the outer limit of travel of the traversing reel. The switch 114 on the other hand is actuated by the arm 111 when the outer flange 16 actuates the sensing finger 102, to the left as viewed in FIG. 5, to sense the inner limit of travel of the reel 12. The sensing finger 102 in its center or neutral position shown in FIGS. 2 and 5 is preferably substantially in alignment with the path of the stock, and therefore substantially in alignment with the groove 26 of the guide block and the follower 60 as shown in FIG. 2, so that the last coil of stock is being wound upon the cylinder 13 as the sensing finger 102 is moved through its center position by the flanges of the reel. The limit switches 112, 114 are shown mounted for adjustment by the knobs 118, 120 respectively, and the switches are preferably adjusted so that the stroke of the reel 12 is permitted to overtravel slightly after the sensing finger 102 is moved through its center position. As a result there is a certain "dwell" before the traverse is reversed which permits the first coil of stock of a succeeding course of coils to be wound against the flange of the reel and onto the last coil of stock of the preceding course of coils.

The sensing finger 102 is adapted to be withdrawn from between the flanges of the reel by an air cylinder 121 which is connected for rotating the supporting shaft 106, and which therefore may be conveniently operated with the air cylinder 72 to simultaneously withdraw the sensing finger 102 and the sensing arm 52 when a coil of stock is to be removed from the reel.

Referring to the electrical schematic of FIG. 3, a "Start" button is provided for energizing a relay A and to thereby energize a control circuit for the take-up reel with the relay switch contacts A–2 and A–3. The relay switch contacts A–1 are employed for maintaining the relay A energized and a "Stop" button is shown provided for de-energizing the circuit. The limit switch 112 for the outward or forward travel of the reel 12 is connected for energizing a reverse relay R having switch contacts R-1, R-2 and R-3. The switch contacts R-1 are closed by the relay R for maintaining the reverse relay energized after the reel starts to feed in the reverse direction, the switch contacts R-2 are opened by the relay R to de-energize the forward relay F, and the switch contacts R-3 are closed by the relay R to actuate the shuttle valve 36 and thereby reverse the direction of traverse at the forward limit of travel of the reel. The limit switch 114 similarly provides for energizing the forward relay F for closing the switch contacts F-1 and F-3 and for opening the switch contacts F-2 for reversing the direction of traverse at the inward or rearward limit of travel of the reel. Also, as seen upon reference to the schematic of FIG. 3 the switch 64 is conditioned for energizing the auxiliary pump motor 80 only when the forward relay F is energized and consequently only during the outward or forward feed of the reel. Similarly the switch 66 is conditioned for energizing the auxiliary pump motor 80 only during the inward or rearward feed of the reel 12.

Also in accordance with the preferred embodiment of the present invention the displacement of the primary pump 38 is preset to provide a traverse lead for each revolution of the reel 12 which is slightly less than the width of the stock being coiled upon the reel. Accordingly when the reel 12 is being traversed in the forward or outward direction, the tubular stock 10 will be coiled about the cylinder toward the inner flange 14 at a rate greater than the outward traverse of the reel and will accordingly provide for pivoting the follower 60 from its neutral or center position shown in FIG. 4 to the right as viewed in FIG. 4 to actuate the switch 64. The auxiliary pump motor 80 is thereby energized to increase the traverse feed of the reel 12 until the stock is being fed onto the reel along a path which is more clearly perpendicular to the axis of the reel, whereupon the switch 64 is released to de-energize the auxiliary pump motor 80. The forward traverse feed of the reel thereafter remains at the reduced rate established by the displacement of the primary pump 38 until the switch 64 is actuated again to increase the rate of traversal. The sensing arm 52 therefore cooperates with the switch 64 to moderate the forward feed of the reel and to periodically energize the auxiliary pump motor to increase the forward feed when necessary to maintain the path of stock feed from the guide block 24 to the reel substantially perpendicular to the axis of the reel. Of course, the sensing arm 52 similarly cooperates with the switch 66 to moderate the rearward or inward feed of the reel and to periodically energize the auxiliary pump motor to increase the inward feed when necessary to more nearly align the path of stock feed with the guide block 24.

Thus it can be seen that the take-up reel incorporating the present invention provides for coiling stock in a manner which ensures that the coils of each course of coils are compactly coiled without inadvertent overlapping of coils and which ensures that succeeding courses of coils are evenly coiled upon preceding courses to provide a resulting bundle which is neat in appearance and which is adapted to be easily handled and subsequently uncoiled without inadvertent tangling of the stock within the coil. Additionally the take-up reel incorporating the present invention provides for accurately and reliably sensing the traversing limits of the reel and to reverse the traverse feed in a manner which provides for compactly and evenly coiling the stock on the reel.

I claim:

1. In a take-up reel having a reel for receiving stock for winding the stock into a coil thereon, a stock feed guide for feeding the stock to the reel, and traversing means for producing relative traversal movement between the stock feed guide and reel, the improvement wherein the traversing means comprises feed sensing means for sensing the direction of feed of the stock from the feed guide to the reel and traverse control means operative by the feed sensing means for controlling the traversal rate in accordance with the direction of feed of the stock from the feed guide to the reel, the traversing control means comprising first motor means for producing a first traversal rate, second motor means operative by the feed sensing means for changing the traversal rate in accordance with the direction of feed of the stock from the feed guide to the reel, and an hydraulic actuator for producing relative traversal movement between the stock feed guide and reel, the first motor means comprising a first hydraulic pump connected to the hydraulic actuator for producing said first traversal rate, and the second motor means comprising a second hydraulic pump connected to the hydraulic actuator and operable by the feed sensing means for changing the traversal rate in accordance with the direction of feed of the stock from the feed guide to the reel.

2. In a take-up reel having a driven rotatable reel for receiving stock and winding the stock in a coil thereon, a stock feed guide for feeding the stock to the reel, and traversing means for producing relative traversal movement between the stock feed guide and reel, the improvement wherein the traversing means comprises an hydraulic actuator operable for producing said relative traversal movement in forward and reverse directions for winding the stock in generally helically fashion on the reel, a primary hydraulic pump connected to the hydraulic actuator for producing a first traversal rate, and an auxiliary hydraulic pump hydraulically connected with the primary hydraulic pump for changing the traversal rate, the primary hydraulic pump being connected to be driven with the reel to provide a substantially constant traversal lead for each revolution of the reel.

3. The improvement of claim 1 wherein the first hydraulic pump is presettable to produce a first traversal rate less than optimum, and wherein the second hydraulic pump is connected in parallel with the first hydraulic pump for increasing the traversal rate.

4. The improvement of claim 1 wherein the feed sensing means comprises a stock follower engageable with the stock between the stock feed guide and the reel and means operable by the stock follower for operating the second hydraulic pump.

5. The improvement of claim 4 wherein the feed sensing means further comprises an arm supporting the stock follower pivotally mounted for permitting movement of the stock follower axially of the reel, and switch means operable by the pivotal arm in accordance with the direction of pivotal movement thereof; and wherein the second motor means comprises electric motor means for the second hydraulic pump and operable by the switch means.

6. The improvement of claim 5 wherein the switch means comprises a pair of switches actuated by the pivotal arm in accordance with the pivotal movement thereof in opposite pivotal directions respectively, wherein the first hydraulic pump is presettable to produce a first traversal rate less than optimum, wherein the second hydraulic pump is connected in parallel with the first hydraulic pump for increasing the traversal rate, and wherein the second motor means comprises control means for selectively deactivating the pair of switches in accordance with the direction of said traversal movement.

7. In a traversing take-up reel operating mechanism having a reel drive shaft for supporting a take-up reel and for rotating the take-up reel for winding stock thereon, an hydraulic actuator operable for axially traversing the take-up reel in forward and reverse directions for winding the stock in generally helically fashion thereon, hydraulic pump means for operating the hydraulic actuator, and traversal direction control means for the hydraulic actuator for reversing the traversal direction of the reel, the improvement wherein the hydraulic pump means is controllable to provide a controlled hydraulic output, and wherein the traversing take-up reel operating mechanism further comprises first sensing means for sensing the direction of feed of stock onto the reel and traversal rate control means operative by the sensing means to change the hydraulic output of the hydraulic pump means for changing the traversal rate of the reel in response to a change in the direction of the stock feed, the hydraulic pump means comprising a primary hydraulic pump connected to the hydraulic actuator for traversing the take-up reel at a first traversal rate and an auxiliary hydraulic pump operable by the first sensing means and hydraulically connected with the primary hydraulic pump for changing the traversal rate of the reel in response to a change in the direction of the stock feed.

8. The improvement of claim 7 wherein the primary hydraulic pump has a positive displacement which is presettable to produce a traversal rate slightly less than optimum and wherein the auxiliary hydraulic pump is connected in parallel with the primary hydraulic pump to increase the traversal rate of the reel in response to a change in the direction of the stock feed.

References Cited

UNITED STATES PATENTS

| | | | |
|---|---|---|---|
| 2,254,221 | 9/1941 | Hubbard | 242—158.4 XR |
| 2,626,765 | 1/1953 | Biddison. | |
| 2,933,265 | 4/1960 | Lorenz. | |
| 2,988,292 | 6/1961 | Bliss | 242—158.4 XR |
| 3,039,707 | 6/1962 | Beck et al. | 242—158.2 XR |

FOREIGN PATENTS

| | | |
|---|---|---|
| 836,411 | 6/1960 | Great Britain. |
| 836,412 | 6/1960 | Great Britain. |

STANLEY N. GILREATH, *Primary Examiner.*